UNITED STATES PATENT OFFICE.

HERMAN von UFFEL, OF PHILADELPHIA, PENNSYLVANIA.

VEGETABLE AND MINERAL FIBER FELT.

1,237,000.  Specification of Letters Patent.  Patented Aug. 14, 1917.

No Drawing.   Application filed June 21, 1916.   Serial No. 104,907.

*To all whom it may concern:*

Be it known that I, HERMAN VON UFFEL, a citizen of the United States, and a resident of Philadelphia, in the county of Philadelphia and State of Pennsylvania, have invented a new and Improved Vegetable and Mineral Fiber Felt, of which the following is a full, clear, and exact description.

In the manufacture of roofing and other felts rag stock has been largely employed, and as the supply of this material is extremely limited at the present time, the price of felt has been abnormally increased.

It is the object of the present invention to provide a felt which is made largely of material which hitherto has been discarded as worthless, but as a basis for roofing and other felt it has very valuable properties.

The material referred to is coir or cocoanut fiber which can be obtained in great quantities from various sources. This vegetable fiber may be chemically treated and used alone or mixed with other fibers or impregnated with suitable compounds, according to the use to which the felt is to be put.

In carrying out the invention the coir is washed or sprayed with a strong solution of common salt, and after being thus treated it is mixed with a clear solution of some calcium compound to render the fiber non-inflammable and vermin-proof, thereby adapting the fiber for sheathing or insulating use, and when the fiber thus treated is compressed into sheets or made into a felt it serves as an excellent substitute for hair and rag felt heretofore in use.

If desired, the cocoanut fiber may be mixed with another fiber which will increase the fireproof property of the felt and produce a fabric of closer texture, this added fiber being made of silica by melting 94.64 per cent. pure silica rock and blowing the molten mass into fibrous particles by the use of compressed air. After the coir fiber has been treated with the saline solution and the solution of a calcium compound it is mixed as a semi-wet mass with the artificial silica fiber and the mixture is then felted in the usual manner. The proportions of mineral and vegetable fibers may be varied according to the nature of the felt desired.

A very excellent product is produced by treating and saturating the coir and mineral felt with a high melting point waterproof mastic compound free from oil such, for example, as gilsonite, to which is added powdered calcium compound, ground pure silica rock and mica, whereby a high melting point of the waterproof compound is obtained and the product is made non-inflammable. This waterproof compound formed of a mastic composition with a powder of a calcium compound, ground pure silica rock and mica is also especially adapted for impregnating any kind of felt or fabric stock to render the same fire and waterproof.

A felt made as herein described has great tensile strength, is non-expansible, non-contractible, non-inflammable, heat-insulating, comparatively light and flexible, and is extremely economical to manufacture as compared with rag and hair stock felt, and is capable of various uses to which felt is usually put.

Having thus described my invention, I claim as new and desire to secure by Letters Patent:

1. A fireproof insulating material including cocoanut fiber treated with a saline solution and a solution of a calcium compound.

2. A fireproof insulating material including cocoanut fiber treated with a saline solution and a solution of a calcium compound, and mineral fiber mixed with the cocoanut fiber.

3. A felt of the class described comprising cocoanut fiber treated with saline solution and a solution of a calcium compound to render the fiber fire and vermin-proof, and an artificial silica fiber mixed with the vegetable fiber.

4. A felt consisting of cocoanut fiber treated with a saline solution and a solution of a calcium compound, mineral fiber mixed with the cocoanut fiber, and a water and fireproof compound impregnating the fibers.

5. A felt consisting of cocoanut fiber treated with a saline solution and a solution of a calcium compound, mineral fiber mixed with the cocoanut fiber, and a water and fireproof compound impregnating the fibers, said compound including powdered calcium compound, ground pure silica rock and powdered mica.

HERMAN von UFFEL.